United States Patent
Chilukuri

(10) Patent No.: US 11,002,188 B2
(45) Date of Patent: May 11, 2021

(54) NOZZLE FOR AN AIRCRAFT PROPULSION SYSTEM

(71) Applicant: Rohr, Inc., Chula Vista, CA (US)

(72) Inventor: Radhakrishna Chilukuri, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 196 days.

(21) Appl. No.: 16/131,124

(22) Filed: Sep. 14, 2018

(65) Prior Publication Data

US 2020/0088096 A1 Mar. 19, 2020

(51) Int. Cl.
*F02C 7/047* (2006.01)
*B64D 15/04* (2006.01)

(52) U.S. Cl.
CPC .............. *F02C 7/047* (2013.01); *B64D 15/04* (2013.01)

(58) Field of Classification Search
CPC . B64D 15/04; B64D 2033/0233; F02C 7/047; F02C 6/08; F01D 25/02
See application file for complete search history.

(56) References Cited

U.S. PATENT DOCUMENTS

| | | |
|---|---|---|
| 3,834,157 A | 9/1974 | Hoffmann |
| 4,688,745 A | 8/1987 | Rosenthal |
| 4,757,963 A | 7/1988 | Cole |
| 5,011,098 A | 4/1991 | McLaren et al. |
| RE36,215 E | 6/1999 | Rosenthal |
| 6,131,855 A * | 10/2000 | Porte ................ B64D 15/04 244/134 B |
| 6,267,328 B1 | 7/2001 | Vest |
| 6,354,538 B1 | 3/2002 | Chilukuri |
| 6,702,233 B1 | 3/2004 | DuPont |
| 7,159,383 B2 | 1/2007 | Barton et al. |
| 7,291,815 B2 | 11/2007 | Hubert et al. |
| 7,588,212 B2 | 9/2009 | Moe et al. |
| 8,061,657 B2 | 11/2011 | Rocklin et al. |
| 8,413,930 B2 | 4/2013 | Gregory et al. |
| 9,403,599 B2 | 8/2016 | Binks et al. |
| 9,488,067 B2 | 11/2016 | Johnson et al. |
| 2009/0108134 A1 | 4/2009 | Thodiyil et al. |
| 2015/0086333 A1 | 3/2015 | Schnoebelen |

(Continued)

OTHER PUBLICATIONS

EP search report for EP19197258.7 dated Jan. 30, 2020.

(Continued)

*Primary Examiner* — Katheryn A Malatek
(74) *Attorney, Agent, or Firm* — Getz Balich LLC

(57) ABSTRACT

An assembly is provided for an aircraft propulsion system. This assembly includes an inlet lip for a nacelle inlet structure, a bulkhead and a nozzle. The bulkhead is configured with the inlet lip to form a cavity between the inlet lip and the bulkhead. The nozzle includes a distribution conduit and one or more nozzle ports. The distribution conduit projects longitudinally out from the bulkhead and into the cavity along a conduit centerline. At least a first portion of the distribution conduit tapers as the distribution conduit extends longitudinally along the conduit centerline. The first portion of the distribution conduit has an elongated geometry in a plane perpendicular to the conduit centerline. The one or more nozzle ports are arranged longitudinally along the conduit centerline and fluidly coupled with an internal passage of the distribution conduit.

15 Claims, 9 Drawing Sheets

(56) References Cited

U.S. PATENT DOCUMENTS

| | | |
|---|---|---|
| 2015/0198061 A1 | 7/2015 | Johnson et al. |
| 2015/0260099 A1* | 9/2015 | Gally .................... B64D 15/04 |
| | | 60/779 |
| 2015/0260104 A1 | 9/2015 | Wilson et al. |
| 2015/0291284 A1 | 10/2015 | Victor et al. |
| 2015/0314882 A1 | 11/2015 | Lumbab et al. |
| 2015/0367395 A1 | 12/2015 | Ludlow et al. |
| 2016/0024963 A1 | 1/2016 | Lumbab et al. |
| 2017/0057643 A1 | 3/2017 | Frank |
| 2017/0058772 A1* | 3/2017 | Frank .................... B64D 33/02 |
| 2017/0314412 A1 | 11/2017 | Tiwari |

OTHER PUBLICATIONS

Ji et al., "Preduction of Fully Developed Turbulent Heat Transfer of Internal Helically Ribbed Tubes—An Extension of Gnielinski Equation", International Journal of Heat and Mass Transfer 55, 2012, p. 1375-1384.

* cited by examiner

NOZZLE FOR AN AIRCRAFT PROPULSION SYSTEM

BACKGROUND

1. Technical Field

This disclosure relates generally to a nozzle and, more particularly, to a nozzle for injecting fluid within an aircraft propulsion system.

2. Background Information

A nacelle for an aircraft propulsion system may include an anti-ice system for reducing/preventing ice accumulation on an inlet lip of the nacelle. Various types and configurations of anti-ice systems are known in the art and have various benefits. A typical anti-ice system includes a nozzle for injecting compressor bleed air into a cavity (e.g., a D-duct) within the inlet lip. Various types and configurations of such nozzles are known in the art. While these known nozzles have various benefits, there is still room in the art for improvement.

SUMMARY OF THE DISCLOSURE

According to an aspect of the present disclosure, an assembly is provided for an aircraft propulsion system. This assembly includes an inlet lip for a nacelle inlet structure, a bulkhead and a nozzle. The bulkhead is configured with the inlet lip to form a cavity between the inlet lip and the bulkhead. The nozzle includes a distribution conduit and one or more nozzle ports. The distribution conduit projects longitudinally out from the bulkhead and into the cavity along a conduit centerline. At least a first portion of the distribution conduit tapers as the distribution conduit extends longitudinally along the conduit centerline. The first portion of the distribution conduit has an elongated geometry in a plane perpendicular to the conduit centerline. The one or more nozzle ports are arranged longitudinally along the conduit centerline and fluidly coupled with an internal passage of the distribution conduit.

According to another aspect of the present disclosure, another assembly is provided for an aircraft propulsion system. This assembly includes a nozzle including a distribution conduit, a first nozzle port and a second nozzle port. The distribution conduit includes a plurality of conduit sections arranged longitudinally along a conduit centerline. The plurality of conduit sections include a first conduit section and a second conduit section that is angularly offset from the first conduit section. The first nozzle port is connected to the first conduit section. The second nozzle port is connected to the second conduit section.

According to still another aspect of the present disclosure, another assembly is provided for an aircraft propulsion system. This assembly includes a nozzle including a distribution conduit, a first nozzle port and a second nozzle port. The distribution conduit includes a plurality of conduit sections arranged longitudinally along a conduit centerline. The plurality of conduit sections include a first conduit section and a second conduit section. The first conduit section has an elongated cross-sectional geometry with a first major axis. The second conduit section has an elongated cross-sectional geometry with a second major axis that is offset from the first major axis by an acute angle. The first nozzle port is connected to the first conduit section. The second nozzle port is connected to the second conduit section.

The inlet lip may include an inner lip skin and an outer lip skin. The cavity may extend axially along an axis between a forward end of the inlet lip and the bulkhead. The cavity may extend radially between the inner lip skin and the outer lip skin. The cavity may extend circumferentially about the axis.

A second portion of the distribution conduit may not taper as the distribution conduit extends longitudinally along the conduit centerline. The second portion of the distribution conduit may be between the first portion of the distribution conduit and the bulkhead.

A second portion of the distribution conduit may not taper as the distribution conduit extends longitudinally along the conduit centerline. The first portion of the distribution conduit may be between the second portion of the distribution conduit and the bulkhead.

The first portion of the distribution conduit may continuously taper as the distribution conduit extends longitudinally along the conduit centerline.

The distribution conduit may intermittently taper as the distribution conduit extends longitudinally along the conduit centerline.

At least a portion of the internal passage may taper as the distribution conduit extends longitudinally along the conduit centerline.

The one or more nozzle ports may include a first nozzle port, a second nozzle port and a third nozzle port arranged longitudinally between the first nozzle port and the second nozzle port along the conduit centerline.

The one or more nozzle ports may include a first nozzle port and a second nozzle port. The distribution conduit may include a first conduit section and a second conduit section. The first nozzle port may be connected to the first conduit section. The second nozzle port may be connected to the second conduit section. The second conduit section may be angularly offset from the first conduit section.

The one or more nozzle ports may include a first nozzle port and a second nozzle port.

Each of the one or more nozzle ports may be tapered, e.g., so as to increase flow uniformity to the one or more nozzle ports.

An outlet area of a first of the nozzle ports may be equal to an outlet area of a second of the nozzle ports.

The first conduit section may have a first cross-sectional geometry with a first major axis. The second conduit section may have a second cross-sectional geometry with a second major axis that is angularly offset from the first major axis.

The second conduit section may be angularly offset from the first conduit section by an acute angle.

The plurality of conduit sections may include a third conduit section that is angularly offset from the first conduit section. The nozzle may include a third nozzle port connected to the third conduit section.

The third conduit section may be angularly offset from the second conduit section.

At least a portion of the distribution conduit may taper as the distribution conduit extends longitudinally along the conduit centerline.

At least a portion of the distribution conduit may have an elongated geometry in a plane perpendicular to the conduit centerline.

The foregoing features and the operation of the invention will become more apparent in light of the following description and the accompanying drawings.

DETAILED DESCRIPTION

Figure 1:
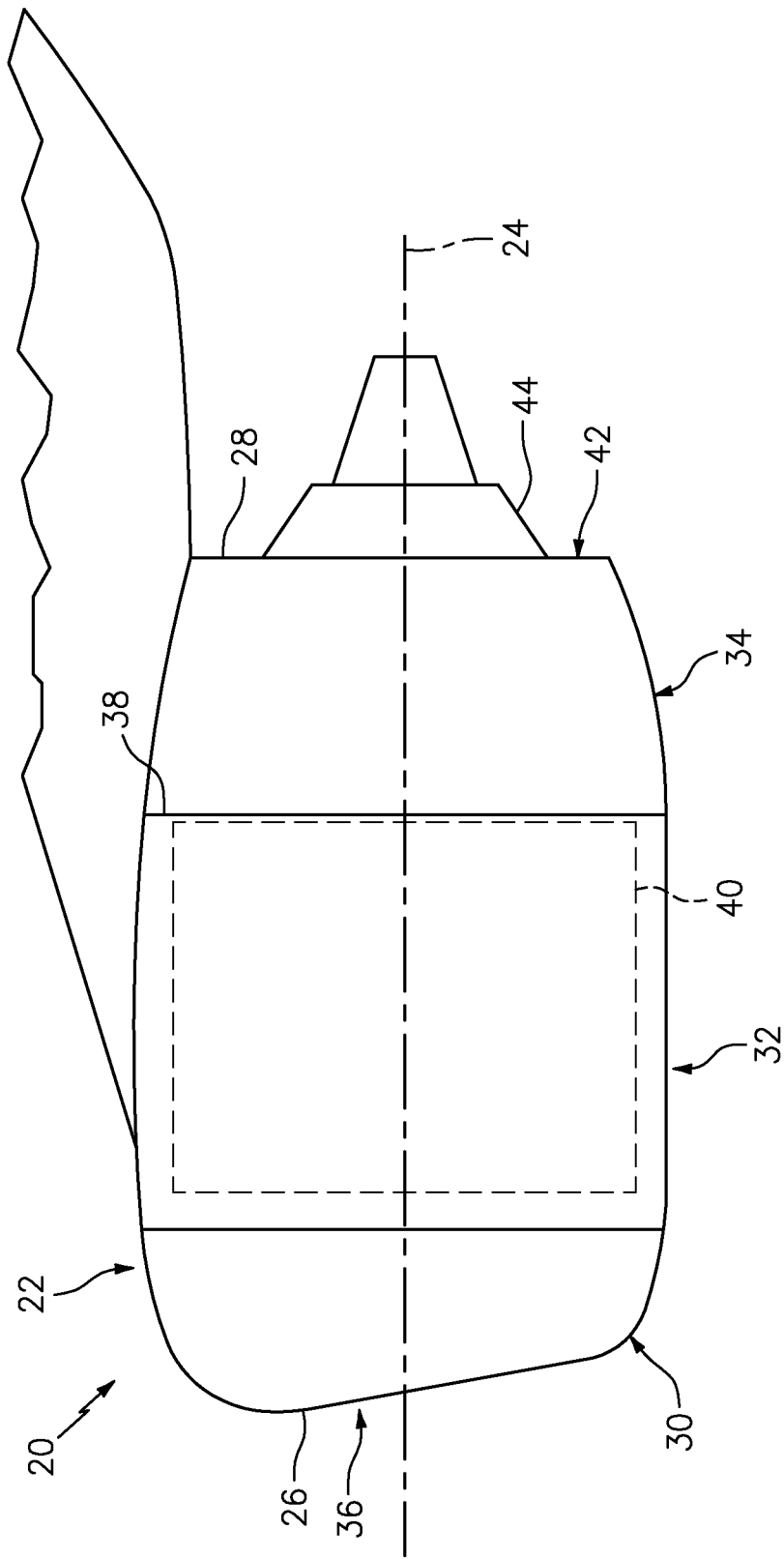
FIG. 1 is a side illustration of an aircraft propulsion system, in accordance with various embodiments.

FIG. 1 illustrates an aircraft propulsion system 20 for an aircraft such as, but not limited to, a commercial airliner. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer structure of the nacelle 22 extends along a nacelle centerline axis 24 between a nacelle forward end 26 and a nacelle aft end 28. The nacelle 22 of FIG. 1 includes a nacelle inlet structure 30, one or more fan cowls 32 (one such cowl visible in FIG. 1) and a nacelle aft structure 34, which may be configured as part of or include a thrust reverser system.

As described below in further detail, the inlet structure 30 is disposed at the nacelle forward end 26. The inlet structure 30 is configured to direct a stream of air through an inlet opening 36 (see also FIG. 2) at the nacelle forward end 26 and into a fan section of the gas turbine engine.

The fan cowls 32 are disposed axially between the inlet structure 30 and the aft structure 34. Each fan cowl 32 of FIG. 1, in particular, is disposed at an aft end 38 of a stationary portion of the nacelle 22, and extends forward to the inlet structure 30. Each fan cowl 32 is generally axially aligned with a fan section of the gas turbine engine. The fan cowls 32 are configured to provide an aerodynamic covering for a fan case 40, which circumscribes the fan section and partially forms an outer peripheral boundary of a bypass flowpath of the propulsion system 20.

The term "stationary portion" is used above to describe a portion of the nacelle 22 that is stationary during propulsion system operation (e.g., during takeoff, aircraft flight and landing). However, the stationary portion may be otherwise movable for propulsion system inspection/maintenance; e.g., when the propulsion system 20 is non-operational. Each of the fan cowls 32, for example, may be configured to provide access to components of the gas turbine engine such as the fan case 40 and/or peripheral equipment configured therewith for inspection, maintenance and/or otherwise. In particular, each of fan cowls 32 may be pivotally mounted with the aircraft propulsion system 20 by, for example, a pivoting hinge system. Alternatively, the fan cowls 32 and the inlet structure 30 may be configured into a single translatable body for example, which may be referred to as a "fanlet". The present disclosure, of course, is not limited to the foregoing fan cowl 32 configurations and/or access schemes.

The aft structure 34 of FIG. 1 is disposed at the nacelle aft end 28. The aft structure 34 is configured to form a bypass nozzle 42 for the bypass flowpath with an inner structure 44 of the nacelle 22; e.g., an inner fixed structure (IFS). The aft structure 34 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 2:
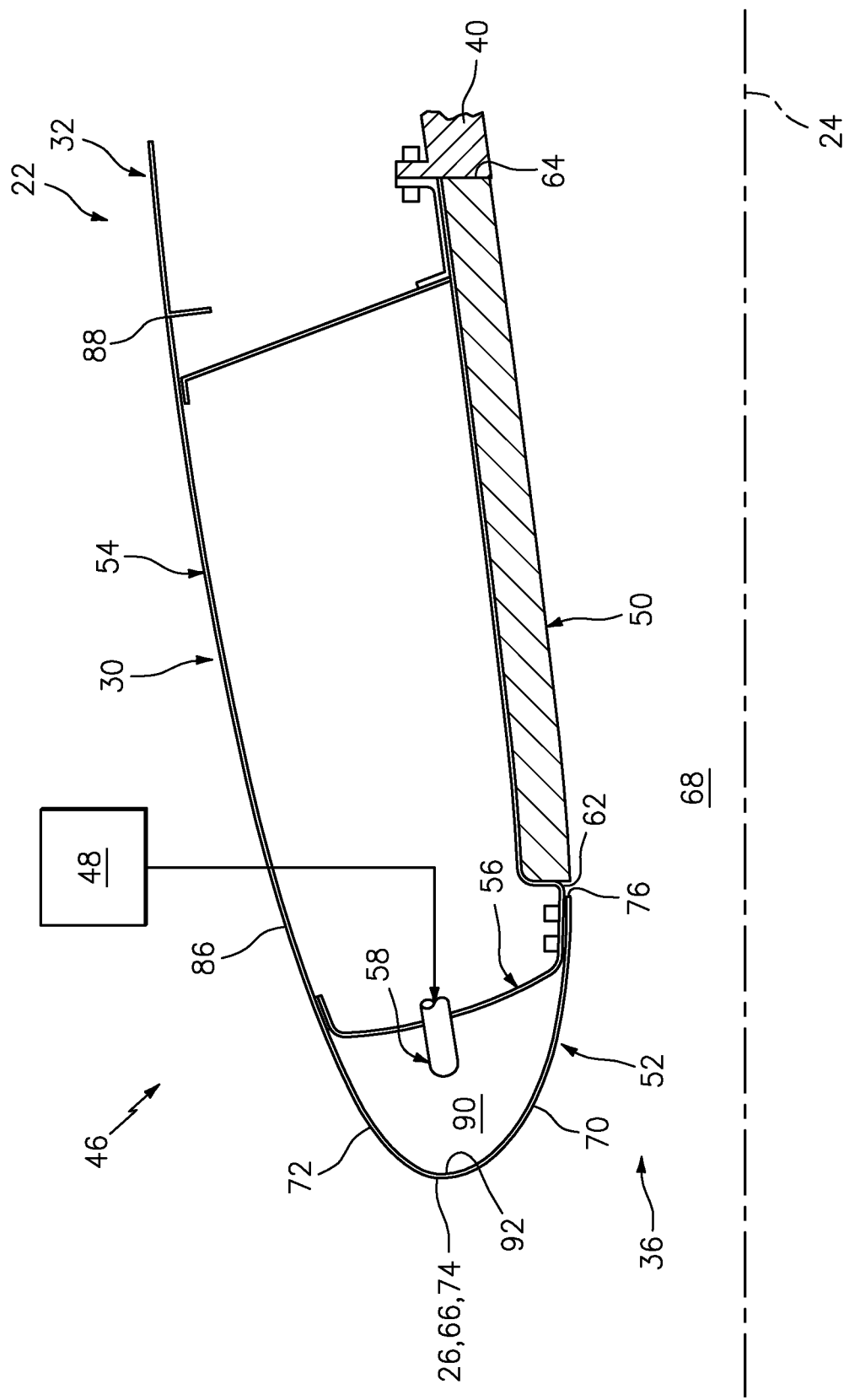
FIG. 2 is a schematic side sectional illustration of an assembly of the propulsion system of FIG. 1, in accordance with various embodiments.

FIG. 2 is a schematic side sectional illustration of an assembly 46 of the propulsion system 20 of FIG. 1. This propulsion system assembly 46 includes the inlet structure 30, the fan cowls 32 (one shown) and the fan case 40. The propulsion system assembly 46 also includes a thermal anti-icing system 48, which may be configured to receive relatively hot compressed bleed air from a compressor section (e.g., a high pressure compressor (HPC) section or a low pressure compressor (LPC) section) of the gas turbine engine.

The inlet structure 30 in FIG. 2 includes a tubular inner barrel 50, an annular inlet lip 52, a tubular outer barrel 54 and at least one forward (e.g., annular) bulkhead 56. The inlet structure 30 also includes at least one nozzle 58 for the thermal anti-icing system 48.

The inner barrel 50 extends circumferentially around the centerline axis 24. The inner barrel 50 extends axially along the centerline axis 24 between an inner barrel forward end 62 and an inner barrel aft end 64.

The inner barrel 50 may be configured to attenuate noise generated during propulsion system operation and, more particularly for example, noise generated by rotation of the fan. The inner barrel 50 of FIG. 2, for example, includes at least one tubular acoustic panel or an array of arcuate acoustic panels arranged around the centerline axis 24. Each acoustic panel may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 52 forms a leading edge 66 of the nacelle 22 as well as the inlet opening 36 to the gas path 68. The inlet lip 52 has a cupped (e.g., generally U-shaped) cross-sectional geometry, which extends circumferentially as an annulus around the centerline axis 24. The inlet lip 52 includes an inner lip skin 70 and an outer lip skin 72, which skins 70 and 72 may be formed together from a generally contiguous sheet material. Examples of such sheet material include, but are not limited to, metal (e.g., aluminum (Al) or titanium (Ti) sheet metal) or composite material (e.g., fiber-reinforcement within a polymer matrix).

The inner lip skin 70 extends axially from an intersection 74 with the outer lip skin 72 at the nacelle forward end 26 to the inner barrel 50. An aft end 76 of the inner lip skin 70 is attached to the forward end 62 of the inner barrel 50 with, for example, one or more fasteners; e.g., rivets, bolts, etc. The inner lip skin 70 may also or alternatively be bonded (e.g., welded, brazed, adhered, etc.) to the inner barrel 50. Of course, the present disclosure is not limited to any particular attachment techniques between the inlet lip 52 and the inner barrel 50.

The outer lip skin 72 extends axially from the intersection 74 with the inner lip skin 70 at the nacelle forward end 26 to the outer barrel 54.

The outer barrel 54 has a tubular outer barrel skin 86 that extends circumferentially around the centerline axis 24. The outer barrel skin 86 extends axially along the centerline axis 24 between the inlet lip 52 and, more particularly, the outer lip skin 72 and an aft end 88 of the outer barrel 54.

The outer barrel 54 and its skin 86 may be formed integrally with the outer lip skin 72 and, more particularly, the entire inlet lip 52 as shown in FIG. 2. The inlet lip 52 and the outer barrel 54, for example, may be formed from a monolithic skin such as, for example, a formed piece of sheet metal. Such a monolithic skin may extend longitudinally from the aft end 76 of the inner lip skin 70 to the aft end 88 of the outer barrel 54. This monolithic skin therefore integrally includes the inner lip skin 70, the outer lip skin 72 as well as the outer barrel skin 86. In such embodiments, the monolithic skin may be formed as a full hoop body, or circumferentially segmented into arcuate (e.g., circumferentially extending) bodies which are attached in a side-by-side fashion circumferentially about the centerline axis 24. The present disclosure, however, is not limited to such exemplary configurations. For example, in other embodiments, the inlet lip 52 may be formed discrete from the outer barrel 54 where the outer lip skin 72 is discrete from the outer barrel skin 86.

The forward bulkhead 56 is configured with the inlet lip 52 to form a forward cavity 90 (e.g., annular D-duct) within the inlet lip 52. The forward bulkhead 56 of FIG. 2, in particular, is axially located approximately at (e.g., proximate, adjacent or on) the aft end 76 of the inlet lip 52. The forward bulkhead 56 may be configured as a substantially annular body, which may be continuous or circumferentially segmented. The forward bulkhead 56 is attached to and extends radially between the inner lip skin 70 and the outer lip skin 72. The forward bulkhead 56 may be mechanically fastened to the inlet lip 52 with one or more fasteners. The forward bulkhead 56 may also or alternatively be bonded and/or otherwise connected to the inlet lip 52.

Figure 3:
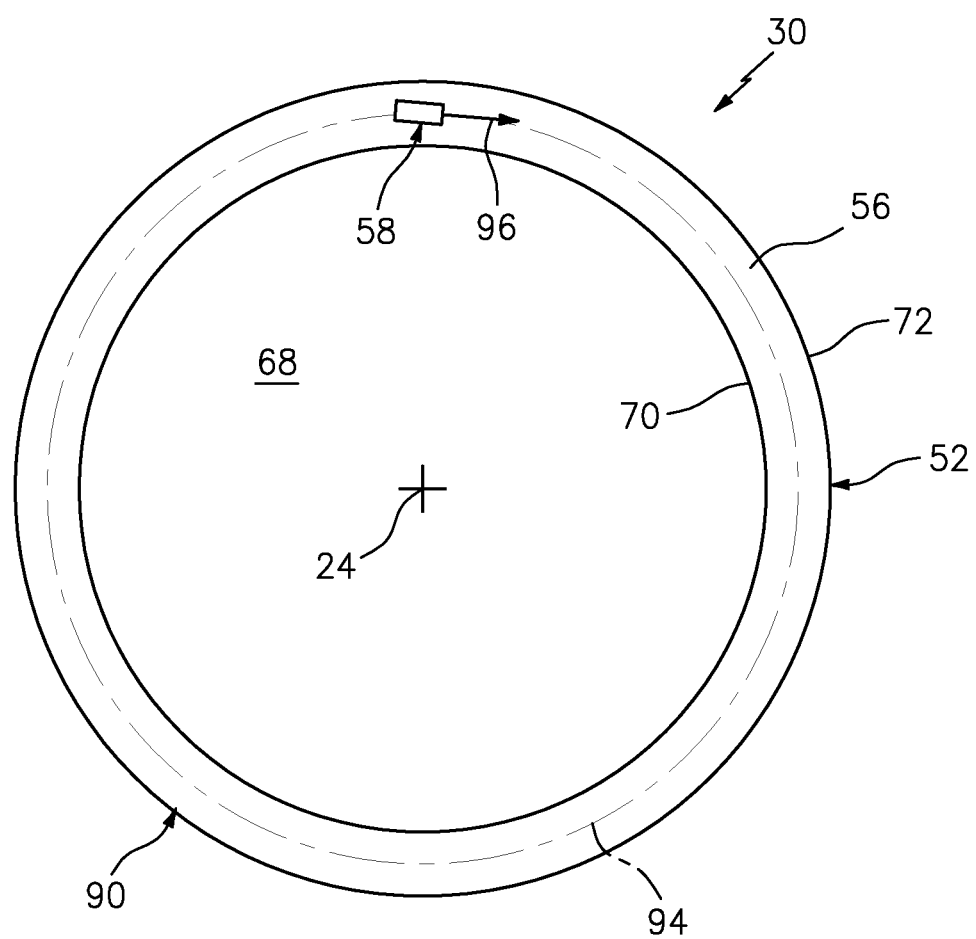
FIG. 3 is a schematic cross-sectional illustration of a nacelle inlet lip assembly, in accordance with various embodiments.

The cavity 90 extends axially within the inlet lip 52 from a forward end 92 of the inlet lip 52 (e.g., at the intersection 74) to the forward bulkhead 56. The cavity 90 extends radially within the inlet lip 52 from the inner lip skin 70 to the outer lip skin 72. Referring to FIG. 3, the cavity 90 also extends laterally (e.g., circumferentially) along a cavity lateral/curvilinear centerline 94 of the cavity 90 within the inlet lip 52, which curvilinear centerline 94 extends circumferentially about the centerline axis 24.

The nozzle 58 is configured to inject fluid 96 (e.g., heated air) received from the thermal anti-icing system 48 generally laterally into the cavity 90. For example, the nozzle 58 can direct the fluid 96 into the cavity 90 tangentially to the centerline 94. In another example, the nozzle 58 can direct the fluid 96 into the cavity 90 slightly inward; e.g., generally tangentially, but with a slight radial inward component towards the inner lip skin 70. In still another example, the nozzle 58 can direct the fluid 96 into the cavity 90 slightly outward; e.g., generally tangentially, but with a slight radial outward component towards the outer lip skin 72. The fluid 96 may also have a slight axial component as described below in further detail.

Figure 4:
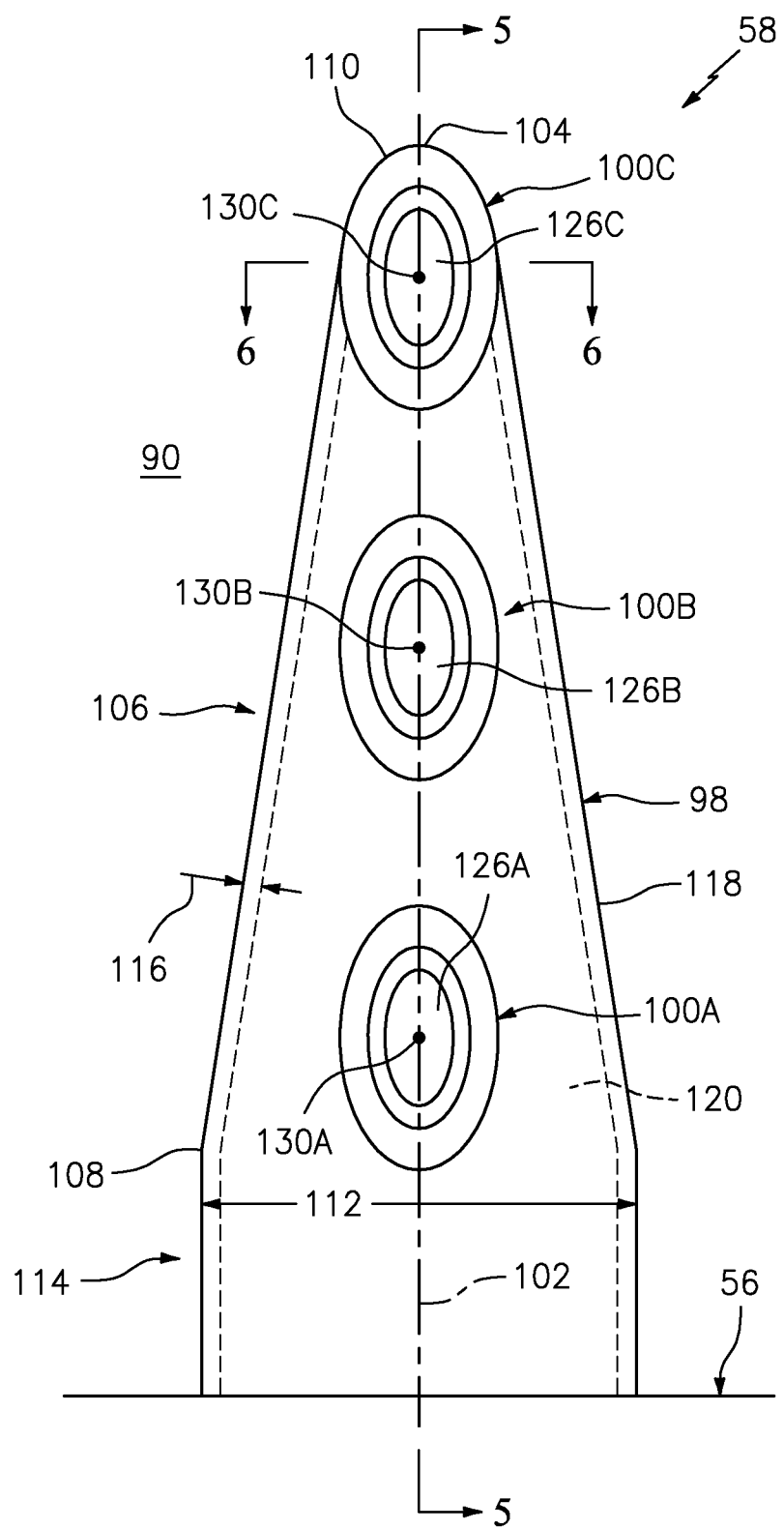
FIG. 4 is a side illustration of a nozzle projecting out from a bulkhead, in accordance with various embodiments.
Figure 5:
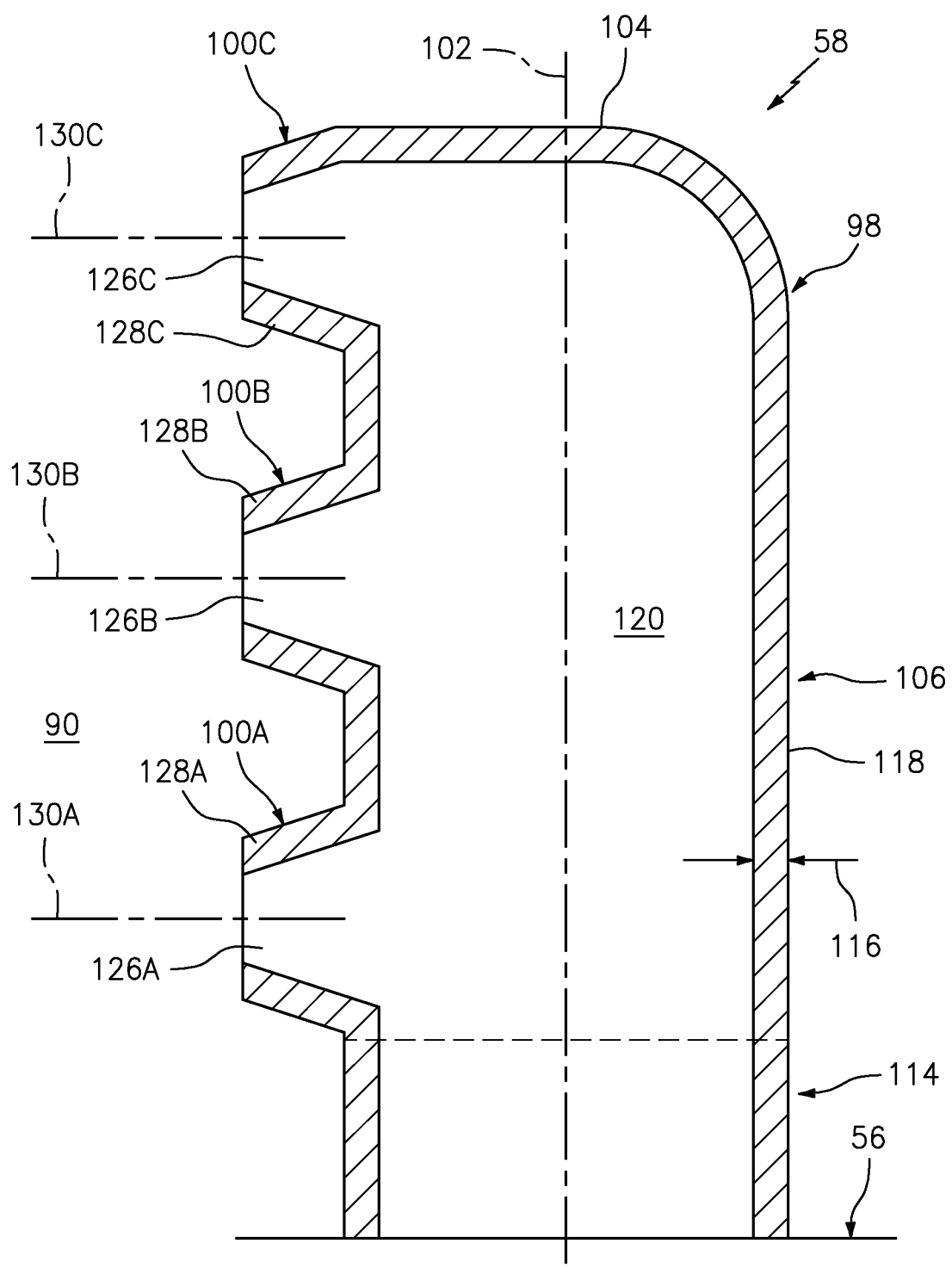
FIG. 5 is a side sectional illustration of the nozzle taken along line 5-5 in FIG. 4, in accordance with various embodiments.
Figure 6:
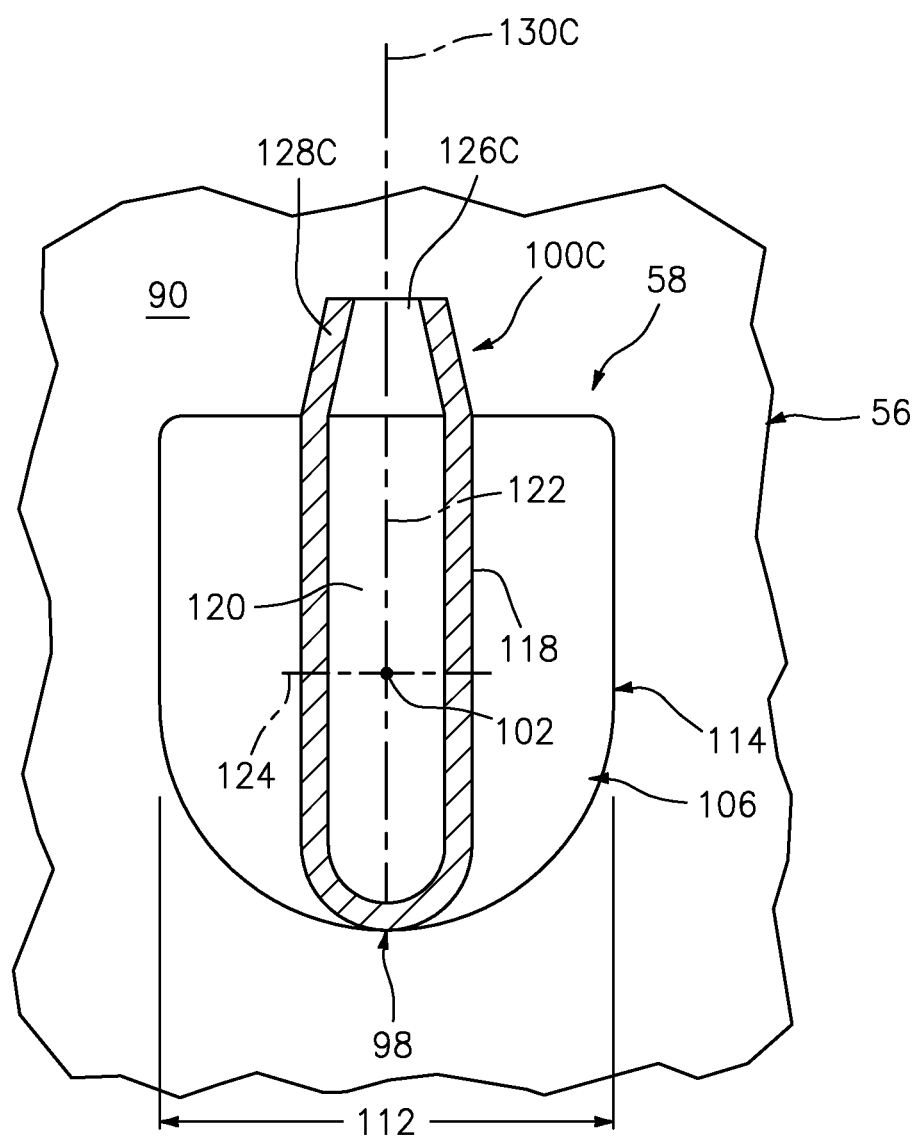
FIG. 6 is a cross sectional illustration of the nozzle taken along line 6-6 in FIG. 4, in accordance with various embodiments.

Referring to FIGS. 4-6, the nozzle 58 includes a distribution conduit 98 (e.g., a nozzle stem/manifold) and one or more nozzle ports 100A-C (generally referred to as "100") (e.g., nozzle heads). The distribution conduit 98 may be connected (e.g., mounted) to the bulkhead 56, and projects longitudinally out from the bulkhead 56 and into the cavity 90 along a longitudinal conduit centerline 102 to a nozzle distal end 104.

Referring to FIG. 4, at least a portion 106 (hereinafter "a tapered portion") of the distribution conduit 98 may taper as the conduit 98 extends longitudinally along the conduit centerline 102 in a direction away from the bulkhead 56 and towards the nozzle distal end 104 and the lip skin 52 (see FIG. 2). Such taper may increase flow uniformity to the nozzle ports 100 relative to a nozzle without a tapered distribution conduit. The tapered portion 106 of FIG. 4 extends longitudinally along the conduit centerline 102 between a proximal end 108 and a distal end 110, where the proximal end 108 may be the end closest to the bulkhead 56 and the distal end 110 may be the end closest to the nozzle distal end 104 (here, at the nozzle distal end 104). A value of a width 112 (e.g., a radial width relative to the centerline axis 24; see FIG. 2) of the distribution conduit 98 decreases as the tapered portion 106 extends longitudinally along the conduit centerline 102 from the proximal end 108 to the distal end 110. This decrease in width value may be a continuous such that the distribution conduit 98 has a continuous taper as illustrated in FIG. 4. Alternatively, the decrease in width value may be intermittent such that distribution conduit 98 has an intermittent (e.g., stepped) taper as illustrated in FIG. 7.

The distribution conduit 98 of FIG. 4 may also include a non-tapered portion 114. For example, the value of the width 112 of the distribution conduit 98 may remain substantially (+/−2%) or exactly constant as the non-tapered portion 114 extends longitudinally along the conduit centerline 102 from the bulkhead 56 to the proximal end 108. In this specific embodiment, the non-tapered portion 114 is longitudinally between the bulkhead 56 and the tapered portion 106.

Figure 7:
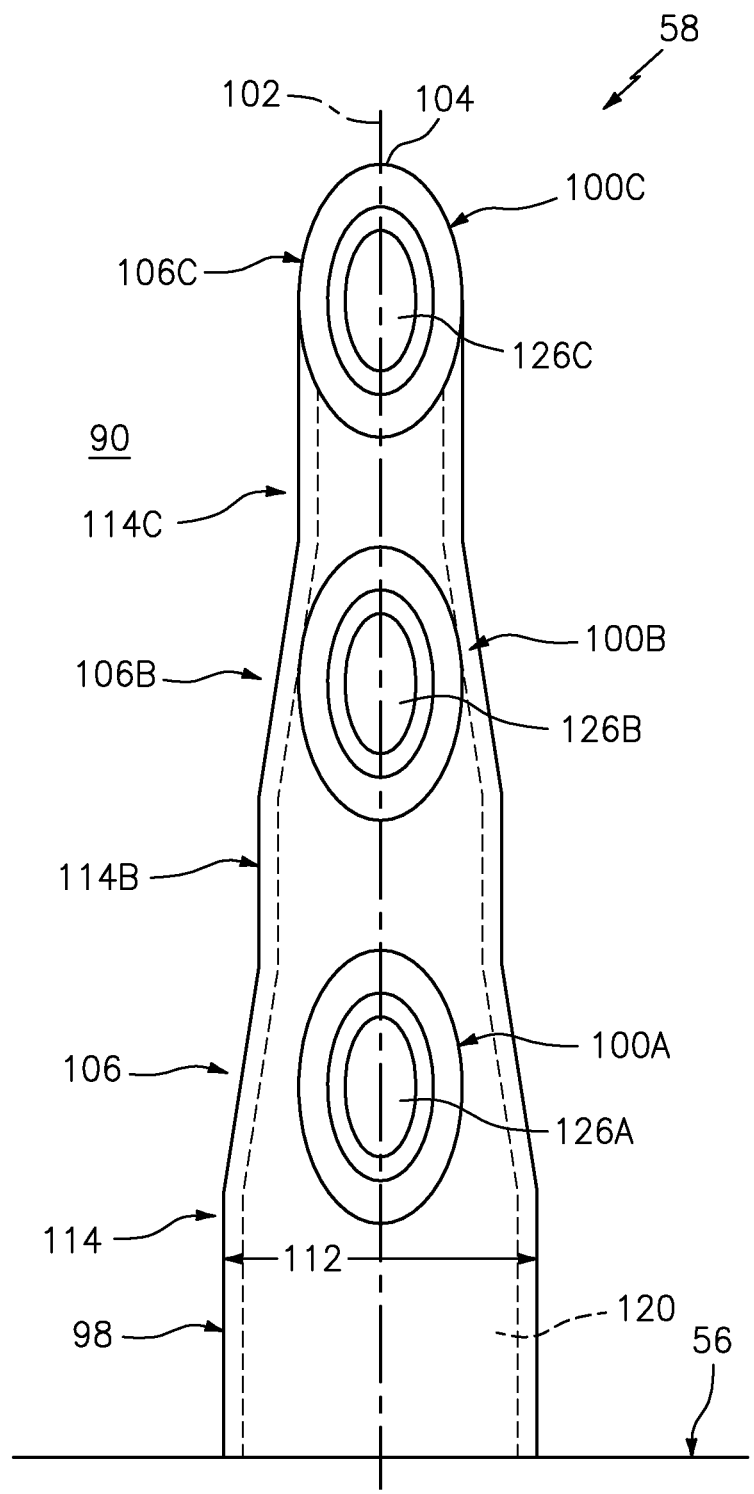
FIG. 7 is a side illustration of an alternative nozzle projecting out from the bulkhead, in accordance with various embodiments.

The distribution conduit 98 of FIG. 7 may also include one or more additional non-tapered portions 114B-C and one or more additional tapered portion 106B-C. In the specific embodiment of FIG. 7, the non-tapered portion 114B is arranged and extends longitudinally along the conduit centerline 102 between the tapered portion 106 and the tapered portion 106B. The tapered portion 106B is arranged and extends longitudinally along the conduit centerline 102 between the non-tapered portion 114B and the non-tapered portion 114C. The non-tapered portion 114C is arranged and extends longitudinally along the conduit centerline 102 between the tapered portion 106B and the tapered portion 106C. The tapered portion 106C is arranged and extends longitudinally along the conduit centerline 102 between the non-tapered portion 114C and the nozzle distal end 104.

Referring to FIG. 4 (see also FIG. 5), a thickness 116 of a sidewall 118 of the distribution conduit 98 may be substantially uniform. With such a configuration, an internal passage 120 (e.g., bore) of the distribution conduit 98 may be tapered in a similar fashion as described above with respect to the distribution conduit 98.

Referring to FIGS. 4-6, at least a portion or an entirety of the distribution conduit 98 may have an elongated geometry (e.g., cross-sectional geometry) when viewed in a plane perpendicular to the conduit centerline 102; e.g., plane of FIG. 6. For example, the elongated geometry of FIG. 5 has a major axis 122 and a minor axis 124, where the major axis 122 runs in a generally axial direction relative to the centerline axis 24 and the minor axis 124 runs in a general lateral (e.g., circumferential/tangential) direction relative to the centerline axis 24. An example of such an elongated geometry is a substantially rectangular geometry (e.g., a rectangular geometry with radiused corners). Another example of such an elongated geometry is a geometry with a radiused (e.g., semi-circular, semi-elliptical, semi-oval, etc.) upstream end and a blunt polygonal (e.g., rectangular) downstream end as shown in FIG. 6. Other examples of such an elongated geometry include, but are not limited to, an oval geometry, an elliptical geometry and a tear-drop shaped geometry.

The nozzle ports 100 are connected to the sidewall 118 of the distribution conduit 98. Each of the nozzle ports 100 and, more particularly, a nozzle orifice 126A-C (generally referred to as "126") of the respective port 100 is fluidly coupled with the internal passage 120 of the distribution conduit 98. The nozzle ports 100 are arranged at respective discrete locations longitudinally along the conduit centerline 102. For example, the first nozzle port 100A is arranged longitudinally between the bulkhead 56 and the second nozzle port 100B. The second nozzle port 100B is arranged longitudinally between the first nozzle port 100A and the third nozzle port 100C. The third nozzle port 100C of FIGS. 4 and 5 is arranged at the nozzle distal end 104.

Each of the nozzle ports 100 may be tapered. More particularly, a sidewall 128A-C of each of the nozzle ports 100 may taper inward as the nozzle port 100 projects out from the distribution conduit 98.

An outlet geometry (e.g., area and/or shape) of each of the nozzle ports 100 and, more particularly, an outlet of each nozzle orifice 126 may be uniform. Of course, in other embodiments, the outlet area and/or the outlet shape of one of the nozzle ports 100 may be different from the outlet area and/or the outlet shape of another one of the nozzle ports 100.

Each of the nozzle ports 100 is configured to direct a respective portion of the fluid (e.g., heated air) received from the internal passage 120 out of the nozzle 100 along a respective trajectory 130A-C (generally referred to as "130"). In the embodiment of FIGS. 4 and 5, the trajectories 130 of the nozzle ports 100 are parallel with one another. However, the present disclosure is not limited to parallel trajectories as described below in further detail.

During operation of the thermal anti-ice system 48 of FIGS. 2 and 3, the fluid 96 (e.g., heated air) is injected generally laterally into the cavity 90 by the nozzle 58 and, more particularly, its nozzle ports 100 (see FIGS. 4-7). This injected fluid 96 causes fluid within the cavity 90 (i.e., previously injected fluid) to flow circumferentially through the cavity 90 along the centerline 94. The tapered and elongated geometry of the nozzle 58 (see FIGS. 4-7) provides the distribution conduit 98 with a relatively small form factor compared to a traditional circular cross-section, non-tapered nozzle. The nozzle 58 of FIGS. 4 and 7 therefore may generate less drag against the fluid moving within the cavity 90 compared to a traditional nozzle. In addition, by reducing internal cavity drag, a swirl factor may be increased and/or a mass flow rate of fluid injected into the cavity 90 may be decreased. The term "swirl factor" may describe a flowrate of fluid within the cavity 90 divided by a flow rate of the fluid 96 injected into the cavity 90.

Figure 8:
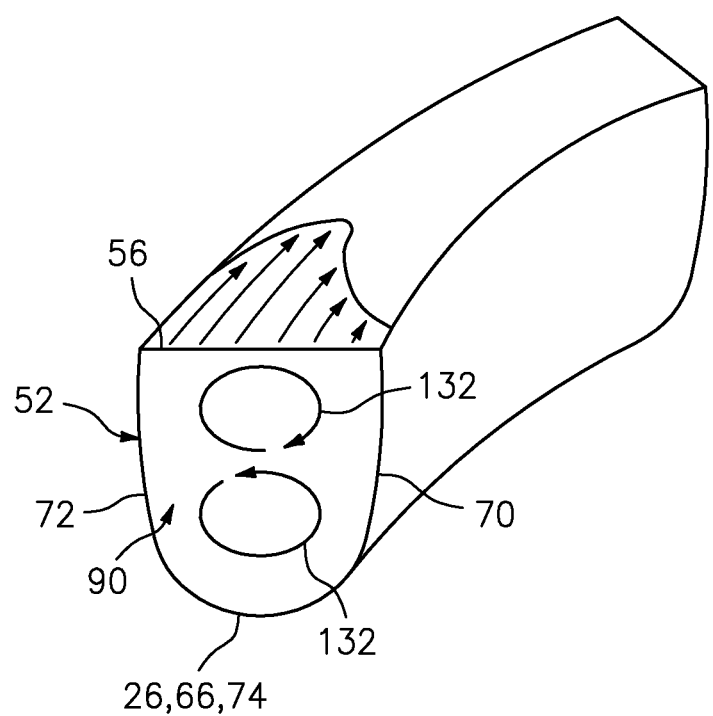
FIG. 8 is a schematic perspective illustration of the inlet lip depicting secondary flow vortices that arise in an annular flow, in accordance with various embodiments.
Figure 9A:
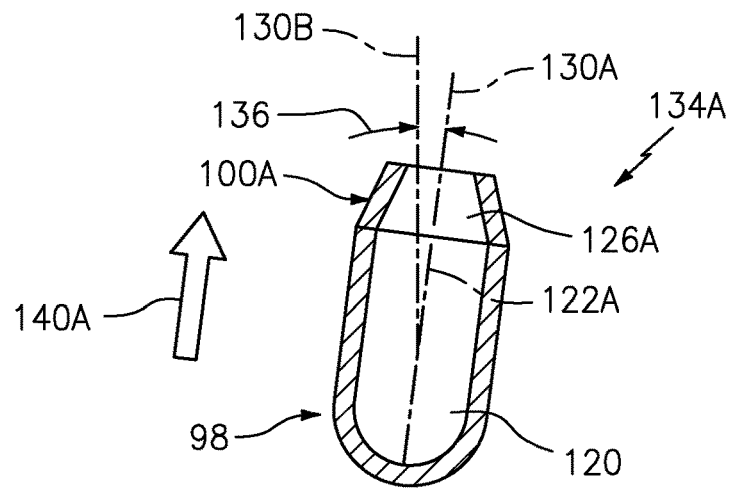
FIGS. 9A-9C are cross sectional illustrations of an alternative nozzle taken at different locations along a longitudinal centerline of the nozzle, in accordance with various embodiments.
Figure 9B:
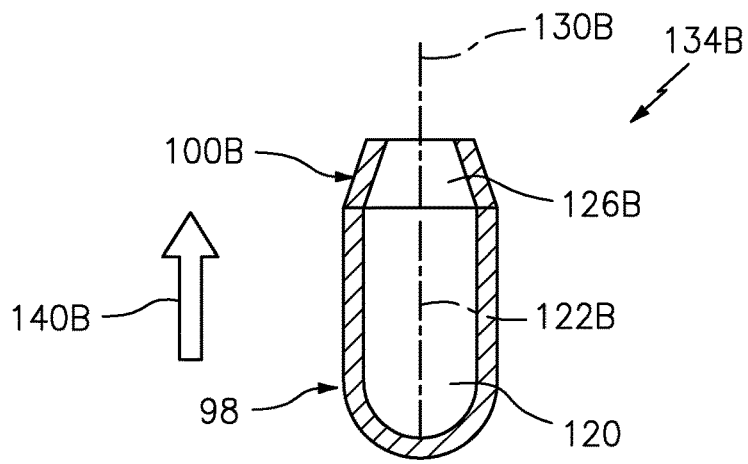
Figure 9C:
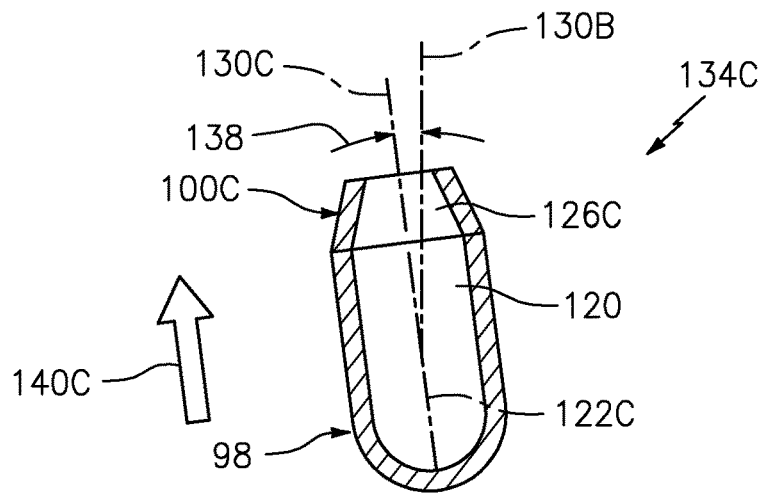

Referring to FIG. 8, the fluid flowing circumferentially within the cavity 90 may also include secondary flow vortices 132 that result in helical streamlines. In an effort to reduce drag within the cavity 90, the nozzle 58 may be configured with longitudinal sections orientated based on expected directions of the helical streamlines within the cavity 90. For example, the nozzle 58 of FIGS. 4 and 7 may each be configured with a plurality of conduit sections 134A-C (generally referred to as "134") as illustrated in FIGS. 9A-C. Each of these conduit sections 134 may be configured with (e.g., connected to) a respective one of the nozzle ports 100. The nozzle section 134A of FIG. 9A is angularly offset from the nozzle section 134B of FIG. 9B, which is angularly offset from the nozzle section 134C of FIG. 9C. For example, the major axis 122A of the nozzle section 134A of FIG. 9A is offset from the major axis 122B of the nozzle section 134B of FIG. 9B by an acute angle 136, which major axis 122B is offset from the major axis 122C of the nozzle section 134C of FIG. 9C by an acute angle 138. The acute angle 136, 138 is greater than zero degrees and less than ninety degrees. The acute angle 136, 138, for example, may be exactly or about (+/−2° 20 degrees. Of course, in other embodiments, the acute angle 136, 138 may be less than 20 degrees or greater than 20 degrees. The major axis 122A of the nozzle section 134A of FIG. 9A may be substantially parallel with the fluid 140A passing around that section 134A. The major axis 122B of the nozzle section 134B of FIG. 9B may be substantially parallel with the fluid 140B passing around that section 134B. The major axis 122C of the nozzle section 134C of FIG. 9C may be substantially parallel with the fluid 140C passing around that section 134C.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nozzle including a distribution conduit, a first nozzle port, a second nozzle port and a third nozzle port;
   the distribution conduit comprising an internal passage and a plurality of conduit sections that are arranged longitudinally along a conduit centerline, the plurality of conduit sections comprising a first conduit section, a second conduit section and a third conduit section, the second conduit section angularly offset from the first conduit section, and the third conduit section angularly offset from the first conduit section;
   the first nozzle port connected to the first conduit section, and the first nozzle port configured to direct a first portion of fluid within the internal passage out of the nozzle along a first trajectory;
   the second nozzle port connected to the second conduit section, and the second nozzle port configured to direct a second portion of the fluid within the internal passage out of the nozzle along a second trajectory that is angularly offset from the first trajectory; and
   the third nozzle port connected to the third conduit section, and the third nozzle port configured to direct a third portion of the fluid within the internal passage out of the nozzle along a third trajectory that is angularly offset from the first trajectory;

wherein the second trajectory is angularly offset from the first trajectory by a first acute angle in a first rotational direction about the conduit centerline; and wherein third trajectory is angularly offset from the first trajectory by a second acute angle in a second rotational direction about the conduit centerline that is opposite the first rotational direction.

2. The assembly of claim 1, wherein the first conduit section has a first cross-sectional geometry with a first major axis; and the second conduit section has a second cross-sectional geometry with a second major axis that is angularly offset from the first major axis.

3. The assembly of claim 1, wherein the second conduit section is angularly offset from the first conduit section by an acute angle.

4. The assembly of claim 1, wherein the third conduit section is angularly offset from the second conduit section.

5. The assembly of claim 1, wherein at least a first portion of the distribution conduit tapers as the distribution conduit extends longitudinally along the conduit centerline.

6. The assembly of claim 5, wherein a second portion of the distribution conduit does not taper as the distribution conduit extends longitudinally along the conduit centerline; and the second portion of the distribution conduit is between the first portion of the distribution conduit and the bulkhead.

7. The assembly of claim 5, wherein a second portion of the distribution conduit does not taper as the distribution conduit extends longitudinally along the conduit centerline; and the first portion of the distribution conduit is between the second portion of the distribution conduit and the bulkhead.

8. The assembly of claim 1, wherein at least a portion of the distribution conduit has an elongated geometry in a plane perpendicular to the conduit centerline.

9. The assembly of claim 1, wherein the third trajectory is angularly offset from the second trajectory.

10. The assembly of claim 1, wherein the first acute angle is twenty degrees.

11. The assembly of claim 1, wherein the first acute angle is greater than zero degrees and less than twenty degrees.

12. The assembly of claim 1, wherein the first acute angle is greater than twenty degrees and less than ninety degrees.

13. The assembly of claim 1, further comprising:

an inlet lip for a nacelle inlet structure; and a bulkhead configured with the inlet lip to form a cavity between the inlet lip and the bulkhead; and the distribution conduit projecting longitudinally out from the bulkhead and into the cavity along the conduit centerline.

14. The assembly of claim 13, wherein the inlet lip includes an inner lip skin and an outer lip skin; and the cavity extends axially along an axis between a forward end of the inlet lip and the bulkhead, the cavity extends radially between the inner lip skin and the outer lip skin, and the cavity extends circumferentially about the axis.

15. The assembly of claim 1, wherein at least a portion of the internal passage tapers as the distribution conduit extends longitudinally along the conduit centerline.

* * * * *